(12) United States Patent
Sato

(10) Patent No.: US 11,073,532 B2
(45) Date of Patent: Jul. 27, 2021

(54) SENSOR MODULE, INCLINOMETER, AND STRUCTURAL HEALTH MONITORING

(71) Applicant: Seiko Epson Corporation, Tokyo (JP)

(72) Inventor: Kenta Sato, Shiojiri (JP)

(73) Assignee: Seiko Epson Corporation

( * ) Notice: Subject to any disclaimer, the term of this patent is extended or adjusted under 35 U.S.C. 154(b) by 243 days.

(21) Appl. No.: 16/296,300

(22) Filed: Mar. 8, 2019

(65) Prior Publication Data

US 2019/0277873 A1 Sep. 12, 2019

(30) Foreign Application Priority Data

Mar. 9, 2018 (JP) .............................. JP2018-043533
Dec. 3, 2018 (JP) .............................. JP2018-226627

(51) Int. Cl.
*G01P 21/00* (2006.01)
*G01P 15/18* (2013.01)
*G01P 1/02* (2006.01)
*G01C 9/02* (2006.01)
*G01P 15/08* (2006.01)

(52) U.S. Cl.
CPC ................ *G01P 1/023* (2013.01); *G01C 9/02* (2013.01); *G01P 15/0802* (2013.01)

(58) Field of Classification Search
CPC ..... G01C 19/5783; G01P 15/08; G01P 15/18; G01P 15/12; G01P 15/125; G01P 15/10; B81B 3/00; G01H 17/00; G08C 17/00; G08C 19/00; H01L 29/84; H04N 5/225; B62D 111/00; B62D 6/00
See application file for complete search history.

(56) References Cited

U.S. PATENT DOCUMENTS

2010/0271787 A1* 10/2010 Holzmann ............ B81B 7/0054
361/729
2011/0303993 A1* 12/2011 Yamamoto .............. H01L 24/02
257/415
2013/0199295 A1* 8/2013 Hoefer ................ G01P 15/0802
73/526

(Continued)

FOREIGN PATENT DOCUMENTS

| JP | H06-016097 A | 1/1994 |
| JP | H07-229921 A | 8/1995 |
| JP | 2006-153800 A | 6/2006 |

(Continued)

*Primary Examiner* — Brandi N Hopkins
(74) *Attorney, Agent, or Firm* — Harness, Dickey & Pierce, P.L.C.

(57) ABSTRACT

A sensor module includes a sensor, a first substrate on which the sensor is mounted, a second substrate coupled to an external connector, conductive members that couple the first substrate and the second substrate, an accommodator that accommodates the first substrate, the second substrate, and a conductive member therein, a lid that closes an opening of the accommodator, a first elastic member in contact with a first main surface of the first substrate and the accommodator, and a second elastic member in contact with a second main surface of the first substrate and the lid. A resonance frequency f1 of the sensor, a resonance frequency f2 of the conductive member, a resonance frequency f3 of the first elastic member, and a resonance frequency f4 of the second elastic member satisfy $f2<f3<f1$ and $f2<f4 \leq f1$.

20 Claims, 14 Drawing Sheets

(56) References Cited

U.S. PATENT DOCUMENTS

2014/0123754 A1  5/2014  Watanabe et al.
2018/0231405 A1  8/2018  Kameta et al.

FOREIGN PATENT DOCUMENTS

| JP | 2013-186108 A | 9/2013 |
| JP | 2014-092531 A | 5/2014 |
| JP | 2014-119412 A | 6/2014 |
| JP | 2016-017792 A | 2/2016 |
| JP | 2016-109531 A | 6/2016 |
| JP | 2017-020829 A | 1/2017 |
| JP | 2017-187294 A | 10/2017 |
| JP | 2018-132311 A | 8/2018 |
| JP | 2018-132349 A | 8/2018 |

\* cited by examiner

SENSOR MODULE, INCLINOMETER, AND STRUCTURAL HEALTH MONITORING

The present application is based on, and claims priority from Japanese Application Serial Number 2018-043533, filed Mar. 9, 2018 and Japanese Application Serial Number 2018-226627, filed Dec. 3, 2018, the disclosures of which are hereby incorporated by reference herein in their entirety.

BACKGROUND

1. Technical Field

The present disclosure relates to a sensor module, an inclinometer, a structural health monitoring, and the like.

2. Related Art

JP-A-6-16097 discloses a viscous body as a softly yielding damping element (D1/D2) being brought into contact with a surface of a sensor unit (E) and the damping element (D1/D2) damping a mechanical vibration of the sensor unit (E) generated at the time of impact acting on the sensor unit (E).

However, since a state of the viscous body tends to change, there is a problem that it is difficult to damp the mechanical vibration of the sensor unit (E) generated by the impact acting on the sensor unit and to keep the sensor unit (E) stable.

SUMMARY

An advantage of some aspects of the present disclosure is to solve at least a part of the problems described above and the present disclosure can be implemented as following aspects or application examples.

(1) A sensor module according to an aspect of the present disclosure includes a sensor, a first substrate on which the sensor is mounted, a second substrate coupled to an external connector, a conductive member that electrically couples the first substrate and the second substrate, an accommodator in which an opening is provided and the first substrate, the second substrate, and the conductive member are accommodated, a lid that closes the opening, a first elastic member in contact with a first main surface of the first substrate and the accommodator, and a second elastic member in contact with a second main surface of the first substrate on an opposite side to the first main surface and the lid, and satisfying f2<f3<f1 and f2<f4<f1, where f1 denotes a resonance frequency of the sensor, f2 denotes a resonance frequency of the conductive member, f3 denotes a resonance frequency of the first elastic member, and f4 denotes a resonance frequency of the second elastic member.

(2) In aspect (1) of the present disclosure, a connector that connects the first elastic member and the second elastic member may be included.

(3) In aspect (1) or (2) of the present disclosure, the first elastic member and the second elastic member may be pressurized, the resonance frequency f3 may be the resonance frequency of the pressurized first elastic member, and the resonance frequency f4 may be the resonance frequency of the pressurized second elastic member.

(4) In aspects (1) to (3) of the present disclosure, 5<A≤30, where A denotes shore A hardness of the first elastic member and the shore A hardness of the second elastic member respectively.

(5) In aspects (1) to (4) of the present disclosure, the first elastic member and the second elastic member may be made of rubber.

(6) In aspects (1) to (5) of the present disclosure, the sensor may measure acceleration.

(7) An inclinometer according to another aspect of the present disclosure includes a sensor module described above in (6) that measures acceleration and a calculator that, based on an output signal from the sensor module attached to a structural body, calculates an inclination angle of the structural body.

(8) A structural health monitoring according to still another aspect of the present disclosure includes a sensor module described above in (6) that measures acceleration, a receiver that receives a measurement signal from the sensor module attached to a structural body, and a calculator that calculates an inclination angle of the structural body based on a signal output from the receiver.

DESCRIPTION OF EXEMPLARY EMBODIMENTS

Hereinafter, a preferable embodiment of the present disclosure will be described in detail. It should be noted that the embodiment to be described below does not unduly limit the scope of the present disclosure described in the appended claims, and all of the configurations to be described in this embodiment are not necessarily indispensable components of the present disclosure.

1. Overview of Sensor Module

Figure 1:
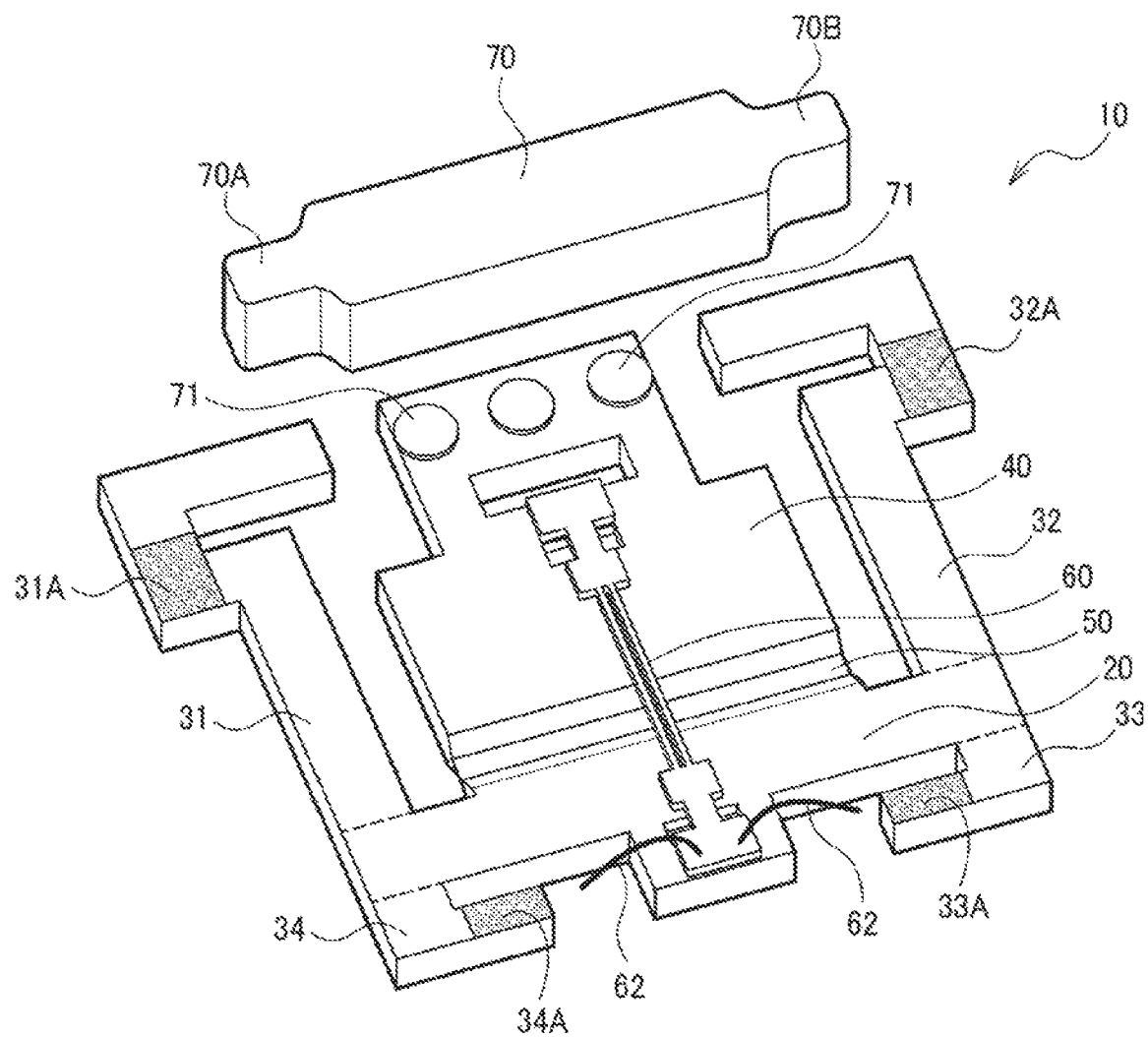
FIG. 1 is a perspective view showing a sensor main body incorporated in a sensor module according to an embodiment of the present disclosure.

FIG. 1 shows a physical quantity sensor main body 10. The physical quantity sensor main body 10 includes a base 20, at least two, three arms for example, of a first arm 31, a second arm 32, a third arm 33, and a fourth arm 34, a movable portion 40 (movable plate), a constrictor 50 (living hinge), and a physical quantity measurement element (oscillator/sensor).

Figure 2:
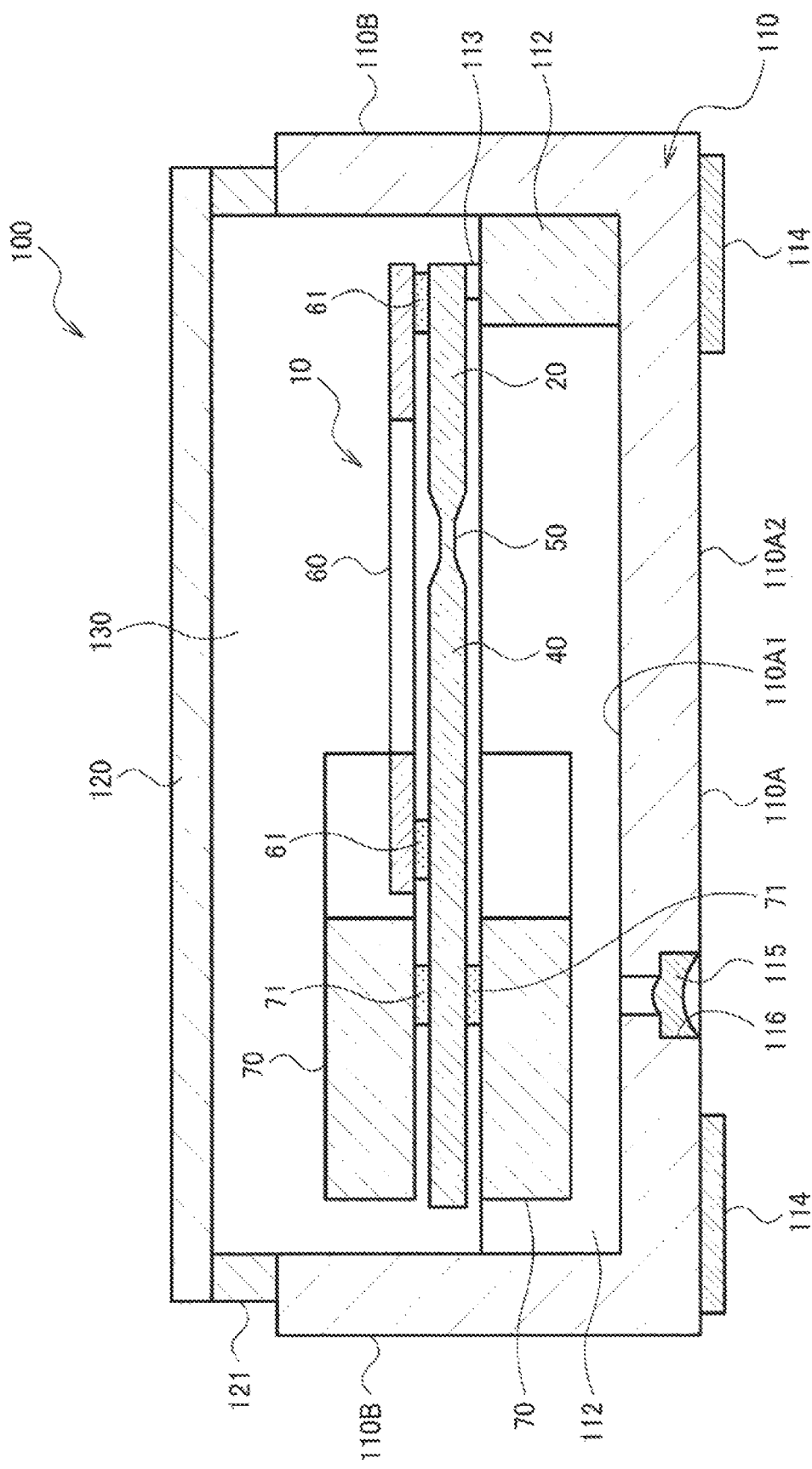
FIG. 2 is a sectional view showing a sensor device incorporated in a sensor module according to the embodiment of the present disclosure.

The first arm 31, the second arm 32, the third arm 33, and the fourth arm 34 are coupled at base ends to the base 20 at positions denoted by broken lines shown in FIG. 1, and preferably, a fixed region 31A, a fixed region 32A, a fixed region 33A, and a fixed region 34A are provided on the free ends. The constrictor 50 is disposed between the base 20 and the movable portion 40 and couples the base 20 and the movable portion 40. The physical quantity measurement element 60 is formed of, for example, a double-ended tuning fork type crystal oscillator and measures acceleration and pressure as a physical quantity, for example. The physical quantity measurement element 60 is disposed (spans) across the constrictor 50 in a plan view as seen from the thickness direction of the base 20 and is attached to the base 20 and the movable portion 40 through a joint 61 (fastener) of an adhesive or the like (refer to FIG. 2). Also, a weight (mass) 70 made of, for example, metal (SUS, copper, or the like) can be disposed on the free end side of the movable portion 40 which is a cantilever with the constrictor 50 as a fulcrum. The weight 70 can be provided not only on the front surface side of the movable portion 40 as shown in FIG. 1 but also on the rear surface side of the movable portion 40 (refer to FIG. 2). As shown in FIGS. 1 and 2, the weight 70 is attached to the movable portion 40 by a joint 71 (fastener) such as an adhesive or the like. Although the weight 70 shown in FIG. 1 moves up and down together with the movable portion 40, both ends 70A and 70B of the weight 70 function as a stopper preventing excessive amplitude by contacting the arm 31 and the arm 32 shown in FIG. 1.

Here, with the constrictor 50 serving as a fulcrum, the movable portion 14 is displaced in accordance with physical quantities such as acceleration and pressure, generating stress in the physical quantity measurement element 60 attached to the base 20 and the movable portion 40. The vibration frequency (resonance frequency) of the physical quantity measurement element 60 varies in accordance with the stress applied to the physical quantity measurement element 60. The physical quantity can be measured based on the variation in the vibration frequency.

FIG. 2 is a sectional view showing a sensor 100 in which a physical quantity sensor main body 10 shown in FIG. 1 is incorporated. The sensor 100 has an accommodator 110 on which the physical quantity sensor main body 10 is mounted. In the present embodiment, the accommodator 110 is configured as a package base including a bottom wall 110A and a side wall 110B. Together with the lid 120, the accommodator 110 forms a package that accommodates the physical quantity sensor main body 10 therein. The lid 120 is joined to the opening end of the accommodator 110 via an adhesive 121.

A step portion 112 one step higher than an inner surface 110A1 of the bottom wall 110A is provided on the bottom wall 110A of the accommodator 110 along three side walls 110B among the four side walls 110B, for example. The step portion 112 may protrude from an inner surface of the side wall 110B or may be integrated with, or separated from, the accommodator 110, but is a part forming the accommodator 110. As shown in FIG. 2, the physical quantity sensor main body 10 is fixed to the step portion 112 with an adhesive 113. Here, an adhesive based on resin (epoxy resin, for example), having a high elastic modulus, may be used as the adhesive 113. Since the adhesive such as low melting point glass is hard, stress strain generated at the time of joining cannot be absorbed and the physical quantity measurement element 60 is adversely affected.

In the present embodiment, as shown in FIG. 1, the physical quantity measurement element 60 may be coupled to an electrode (gold electrode, for example) formed in the step portion 112 by wire bonding 62 and 62. In this case, it is not necessary to form an electrode pattern on the base 20. However, the electrode pattern also provided on the base 20 may be coupled to an electrode formed in the step portion 112 of the accommodator 110 through a conductive adhesive without adopting the wire bonding 62 and 62.

Figure 3:
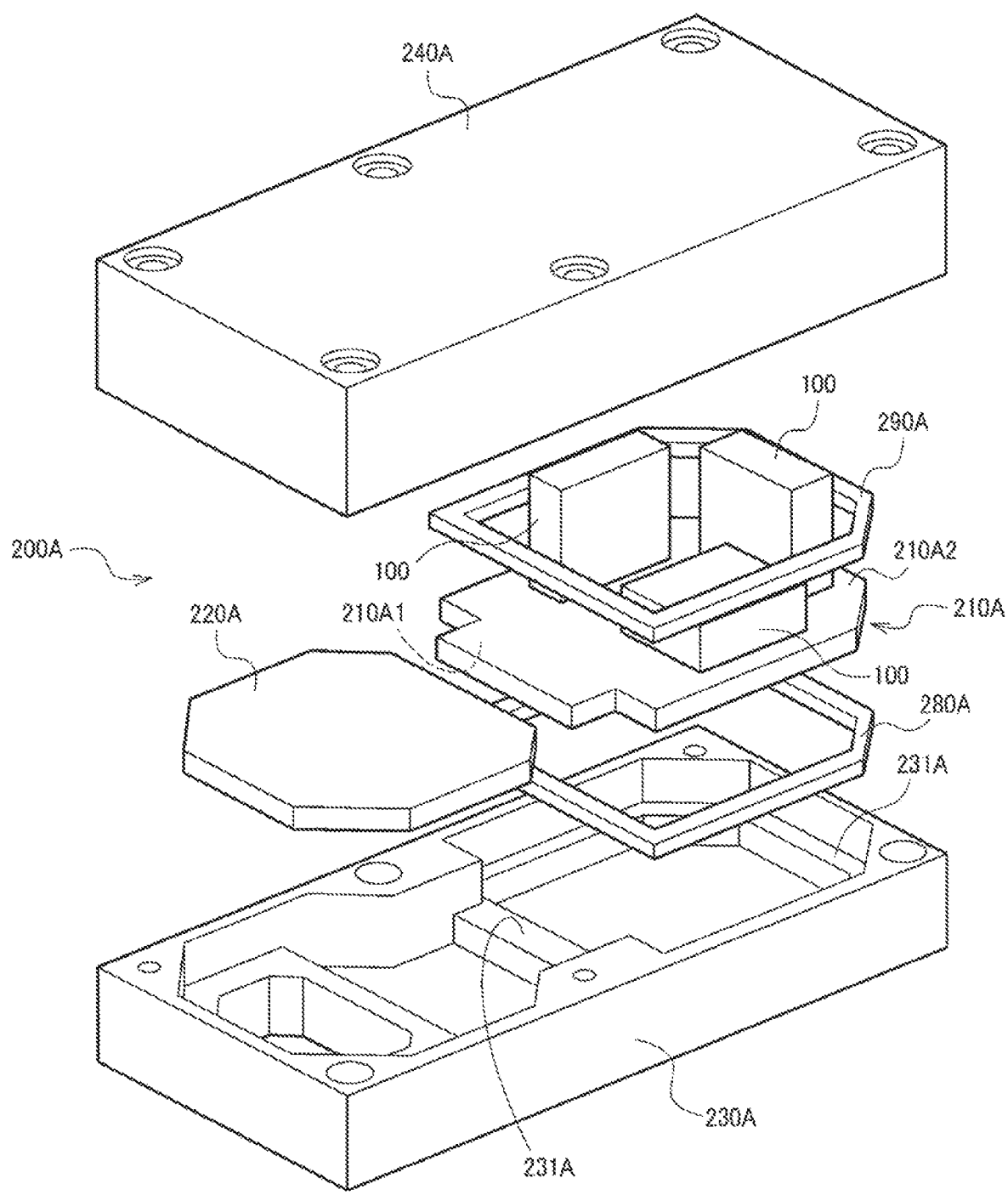
FIG. 3 is an exploded perspective view showing a sensor module having a damping mechanism according to the embodiment of the present disclosure.

An external terminal 114 to be used when the accommodator 110 is mounted on the electronic circuit substrate 210A shown in FIG. 3 is provided on an outer surface (surface on an opposite side to inner surface 110A1) 110A2 of the bottom wall 110A of the accommodator 110. The external terminal 114 is electrically coupled to the physical quantity measurement element 60 through a wire, an electrode, or the like (not shown).

For example, the bottom wall 110A is provided with a sealer 115 that seals an inside (cavity) 130 of the package formed by the accommodator 110 and the lid 120. The sealer 115 is provided in a through hole 116 formed in the accommodator 110. A sealing material is disposed in the through hole 116, heated and melted, and then, solidified such that the sealer 115 is provided. The sealer 115 is provided to hermetically seal the inside of the package.

FIG. 3 is an exploded perspective view showing a triaxial sensor module 200A including three uniaxial sensors 100. In FIG. 3, three sensors 100 are mounted on, for example, a second main surface 210A2 of an electronic circuit substrate (first substrate) 210A having a first main surface 210A1 and a second main surface 210A2. The three uniaxial sensors 100 are provided with measurement axes along three orthogonal axes to measure the physical quantities of the three axes. The circuit substrate 210A is electrically coupled to a connector substrate (second substrate) 220A coupled to an external connector of the sensor module 200A. The circuit substrate 210A and the connector substrate 220A are accommodated and held in a package formed by the package base 230A and the lid 240A.

Figure 4:
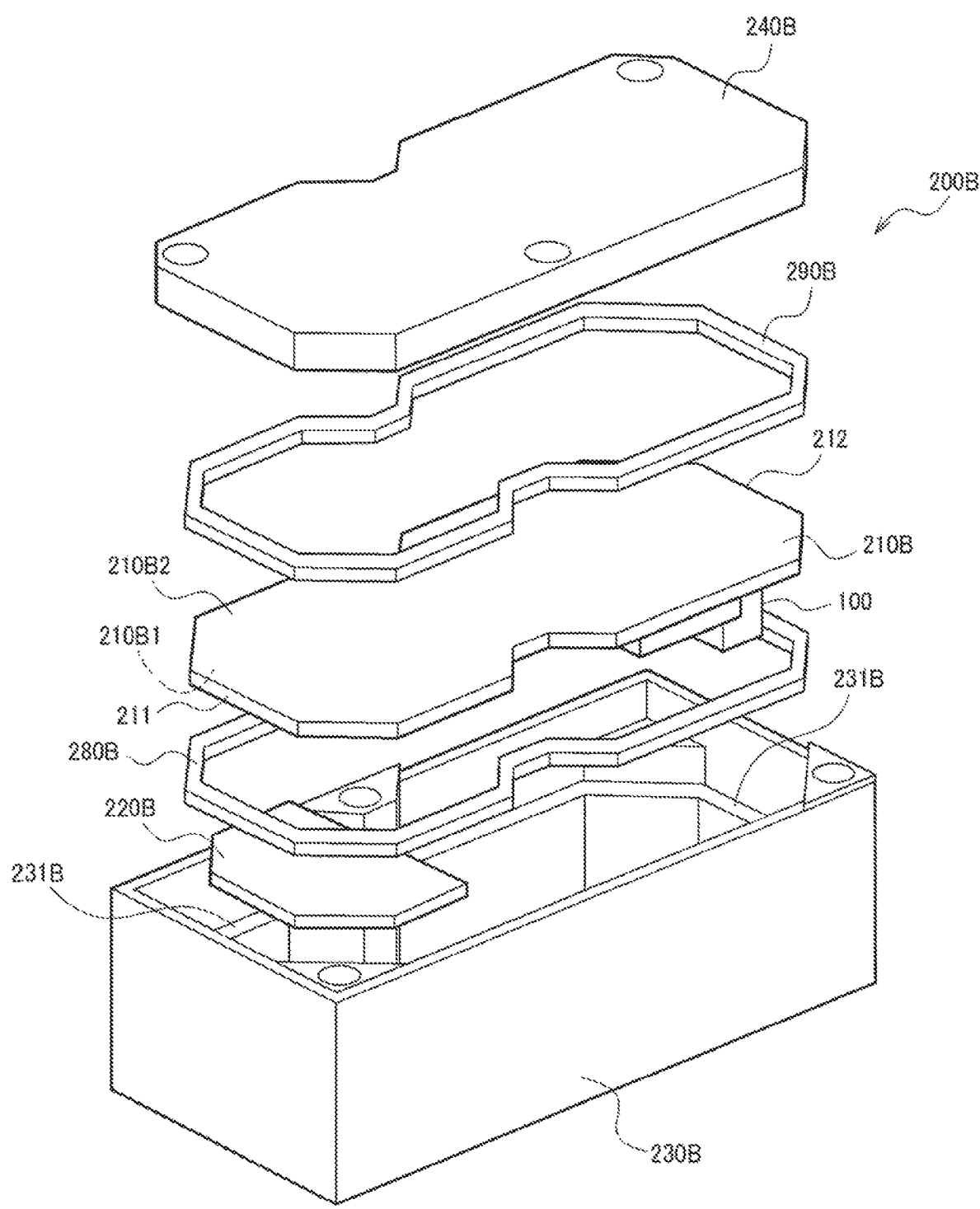
FIG. 4 is an exploded perspective view showing another example of a sensor module having a damping mechanism according to the embodiment of the present disclosure.

FIG. 4 shows a triaxial sensor module 200B different from the sensor module in FIG. 3. The circuit substrate 210A and the connector substrate 220A are arranged side by side on the same plane in FIG. 3, but the circuit substrate (first substrate) 210B and the connector substrate (second substrate) 220B are arranged side by side in the vertical direction (stacked) in FIG. 4. Also in FIG. 4, the circuit substrate 210B and the connector substrate 220B are accommodated and held in the package formed by the package base 230B (also referred to as the accommodator) and the lid 240B. In FIG. 4, unlike in FIG. 3, the sensor 100 is mounted on the first main surface 210B1, which is the lower surface of the circuit substrate 210B, in order to utilize a space secured below the circuit substrate 210B in the accommodator 230B.

Figure 5:
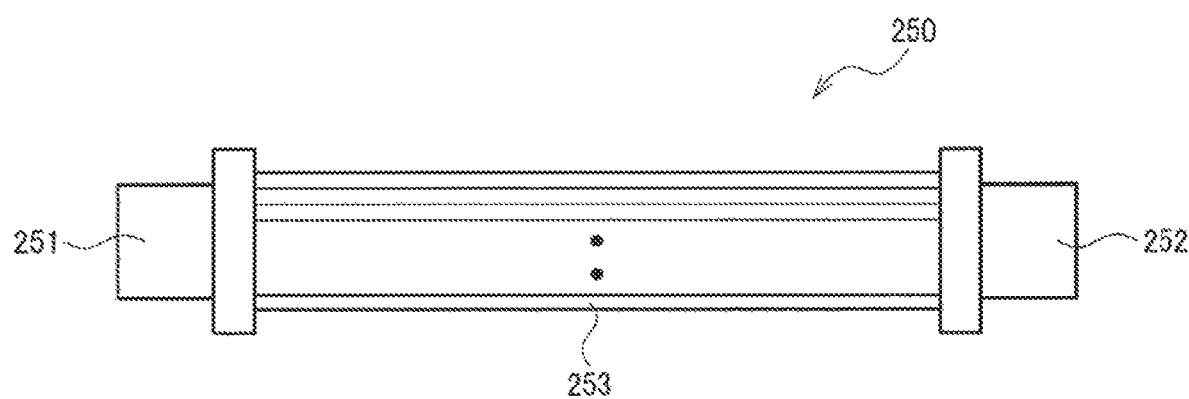
FIG. 5 is a schematic view showing a lead wire which is an example of a conductive member.
Figure 6:
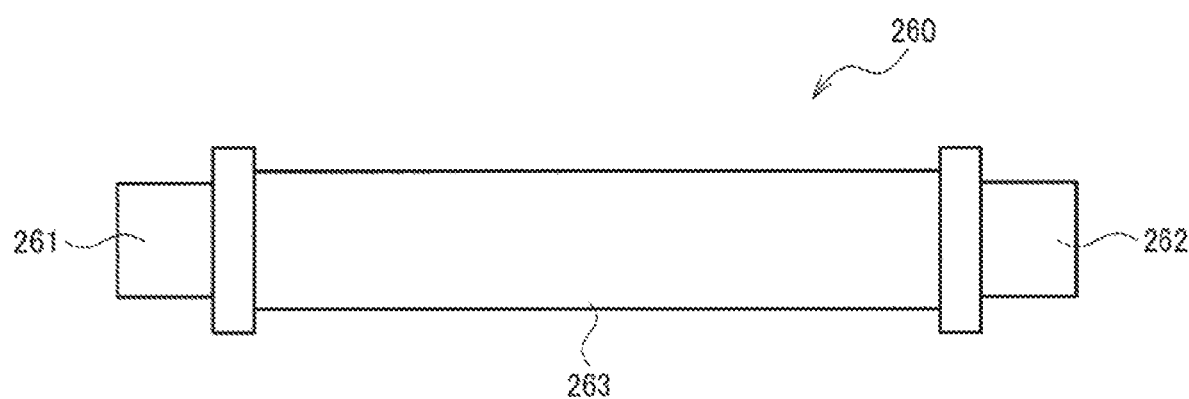
FIG. 6 is a schematic view showing a flat cable which is another example of the conductive member.
Figure 7:
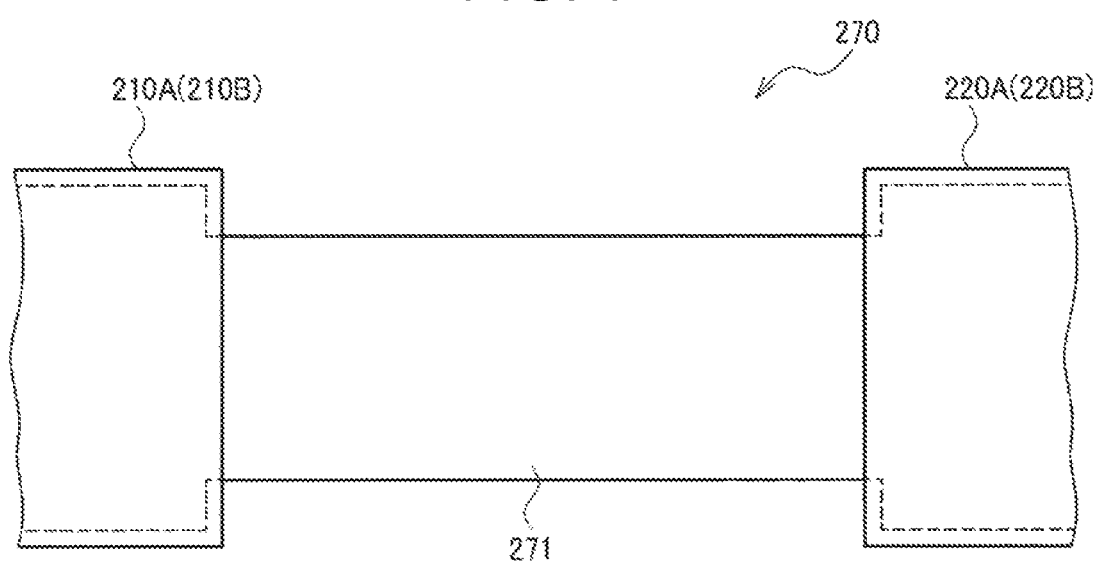
FIG. 7 is a schematic view showing a flexible wiring substrate as still another example of the conductive member.

The circuit substrate 210A and the connector substrate 220A shown in FIG. 3 are electrically coupled by a conductive member. Examples of the conductive member are shown in FIGS. 5 to 7. These conductive members are also used for coupling the circuit substrate 210B and the connector substrate 220B shown in FIG. 4.

A conductive member 250 shown in FIG. 5 has a male connector 251 coupled to a female connector (not shown) of the circuit substrate 210A, a male connector 252 coupled to a female connector (not shown) of the connector substrate 220A, and a lead wire 253 connecting the male connectors 251 and 252 together. The lead wire 253 may or may not be coated with a conductive wire.

A conductive member 260 shown in FIG. 6 has a male connector 261 coupled to a female connector (not shown) of the circuit substrate 210A, a male connector 262 coupled to a female connector (not shown) of the connector substrate 220A, and a flat cable 263 connecting the male connectors 261 and 262 together.

FIG. 7 shows a rigid/flexible substrate 270 in which a rigid substrate and a flexible substrate are integrated. The rigid/flexible substrate 270 has a flexible wiring substrate (conductive member) 271 integrated with the circuit substrate 210A and the connector substrate 220A. The circuit substrate 210A and the connector substrate 220A forming the rigid/flexible substrate 270 have a multilayer structure, and one of the multilayers becomes the flexible wiring substrate 271. When a rigid/flexible substrate is used, a (e.g., female) connector is unnecessary.

2. Damping Structure

In FIG. 3, for example, a ring-shaped first elastic member 280A and a second elastic member 290A disposed below and above the circuit substrate 210A are shown. Similarly, in FIG. 4, for example, a ring-shaped first elastic member 280B and a second elastic member 290B disposed below and above the circuit substrate 210B are shown.

Figure 8:
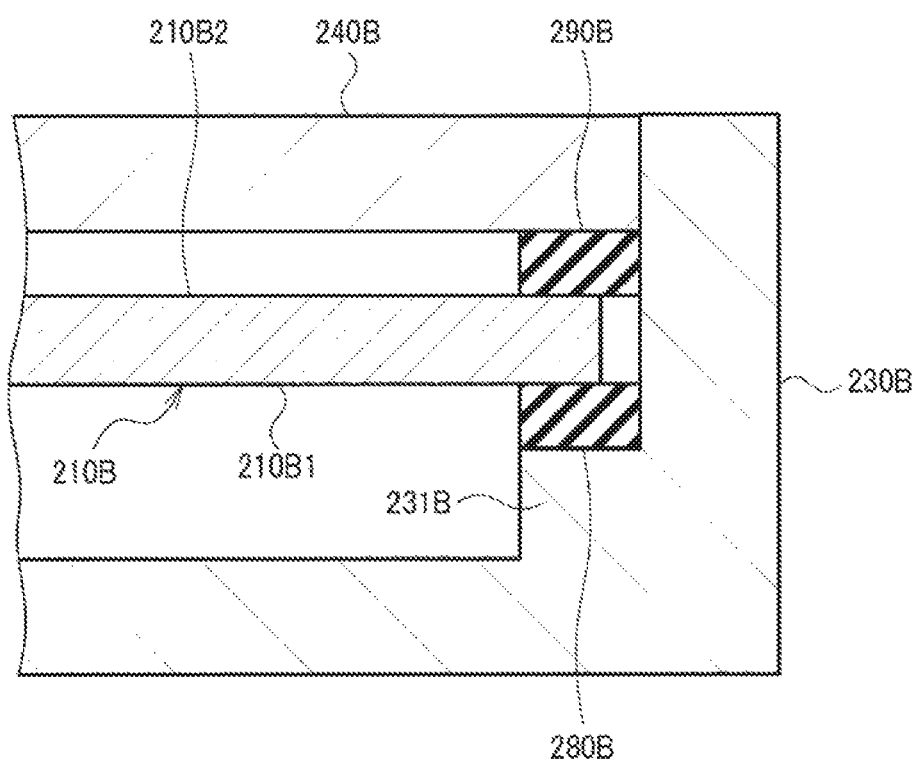
FIG. 8 is a sectional view showing a damping mechanism pinching a circuit substrate between a first elastic member and a second elastic member.

FIG. 8 shows a fastening structure of the circuit substrates 210A and 210B shown in FIG. 3 or 4. In the following description, when one of the FIGS. 3 and 4 is described as an example, the description applies to the other of FIGS. 3 and 4 in the same manner, although FIG. 8 takes an example of the circuit substrate 210B shown in FIG. 4 for description. In FIG. 8, the first elastic member 280B is in contact with the first main surface 210B1 (bottom surface) of the first substrate 210B and the accommodator 230B and has a shape retention characteristic. The second elastic member 290B is in contact with the second main surface 210B2 (top surface) on the side opposite to the first main surface 210B1 of the first substrate 210B and the lid 240B and has a shape retention characteristic.

A step portion 231A (step) is formed one step above the bottom surface in the accommodator 230A in order to bring the first elastic member 280A in contact with the accommodator 230A. As shown in FIG. 3, the step portion 231A is formed in a peripheral region along the inner walls on three sides and a region forming a facing side wall in accordance with the ring shape of the first elastic member 280A. In this case, the lower surface of the ring-shaped first elastic member 280A is in contact with the upper surface of the step portion 231A. In FIG. 4, the step portion 231B is disposed along the inner walls on the four sides in accordance with the ring shape of the first elastic member 280B.

In FIG. 8, the accommodator 230B and the lid 240B are fastened together by, for example, a bolt, a screw, or the like. At this time, the first elastic member 280B is compressed between the step portion 231B and the circuit substrate 210B. Similarly, the second elastic member 290B is compressed between the circuit substrate 210B and the lid 240B. In this way, the first circuit substrate 210B is pinched (sandwiched) and fixed between the first elastic member 280B and the second elastic members 290B above and below.

Referring again to FIG. 3, the first elastic member 280A and the second elastic member 290A are formed of a soft material, a gel or a rubber, for example, that is elastically deformed and collapsed by the fastening between the accommodator 230A and the lid 240A. A shape of the first elastic member 280A and the second elastic member 290A having shape retaining characteristic does not change like a viscous body.

Figure 9:
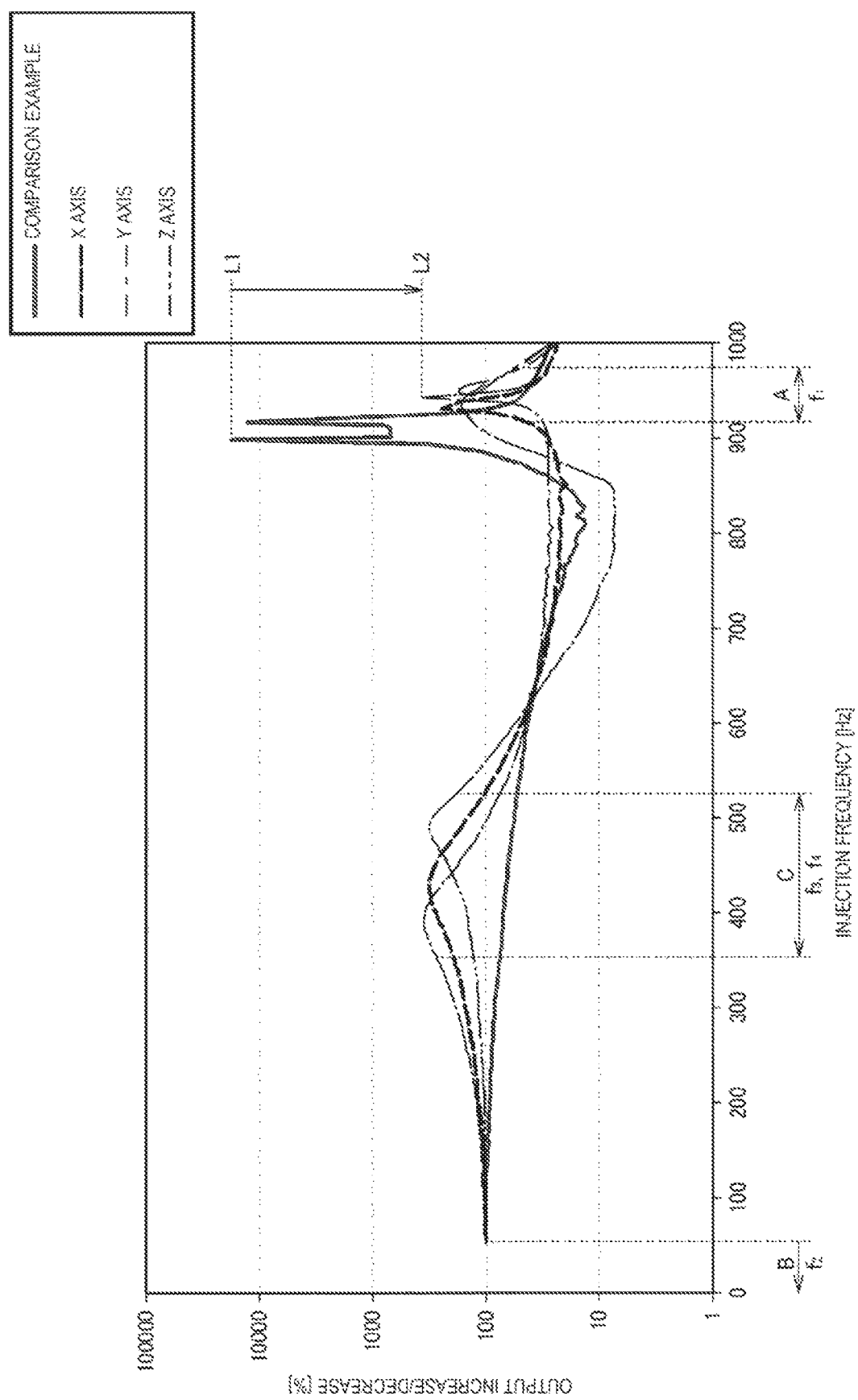
FIG. 9 is a characteristic diagram showing a relationship among resonance frequencies f1, f2, f3, and f4.

In the present embodiment, the circuit substrate 210A on which the sensor 100 is mounted is in contact with a first elastic member 280A, a second elastic member 290A, and a conductive member 250, conductive member 260, or a conductive member 271 shown in FIGS. 5 to 7. Here, the resonance frequency of the sensor 100 is denoted by f1, the resonance frequency of the conductive member 250 (260 and 271) is denoted by f2, the resonance frequency of the first elastic member 280A is denoted by f3, and the resonance frequency of the second elastic member 290A is denoted by f4. The resonance frequencies f1, f2, f3, and f4 in the present embodiment are shown in FIG. 9. The resonance frequency f1 of the circuit substrate 210A is set to a range A of FIG. 9, the resonance frequency f2 of the conductive member 250 (260 and 271) is set to a range B of FIG. 9, and the resonance frequency f3 of the first elastic member 280A and the resonance frequency f4 of the second elastic member 290A are set to a range C of FIG. 9.

That is, in the present embodiment, the following inequalities (1) and (2) are provided:

$$f2 < f3 < f1 \qquad (1); \text{ and}$$

$$f2 < f4 < f1 \qquad (2).$$

2. Effect by Damping Mechanism

FIG. 9 shows an output increase/decrease (%) of the sensor module 200A (200B) of the present embodiment being driven when the excitation frequency varies as shown by the horizontal axis of FIG. 9, with the output near the excitation frequency of 100 Hz being set to 100%. As a result, the frequency at which the sensor module 200A (200B) resonates is known. In the actual use of the sensor module 200A (200B), the resonance frequency f1 on each measurement axis of X axis, Y axis and Z axis of the sensor 100, equal to the resonance frequency of the circuit substrate 210A, is selected from a high frequency range of approximately 900 to 1000 Hz (range A of FIG. 9) for example.

Factors affecting the sensor 100 in the sensor module 200A from the outside are the conductive member 250 (260 and 271) in contact with the circuit substrate 210A, the first elastic member 280A and the second elastic member 290A.

First, the conductive member 250 (260 and 271) in contact with a circuit substrate 210A on which the sensor 100 is mounted, the lead wire 253 shown in FIG. 5, the flat cable 263 shown in FIG. 6 and the flexible wiring substrate 271 shown in FIG. 7 have a functional flexibility characteristic. Therefore, the resonance frequency f2 of the conductive member 250 (260 and 271) is sufficiently lower than the resonance frequency f1 on the measurement axes of the X axis, Y axis and Z axis of the sensor 100. Therefore, the vibration of the conductive member 250 (260 and 271) does not adversely affect the resonance frequency of the sensor 100. Unlike this, coupling, wire bonding and the like between the connectors, in which the resonance frequency rises high, are not suitable as a conductive member in the present embodiment.

Next, the first elastic member 280A and the second elastic member 290A in contact with the circuit substrate 210A on which the sensor 100 is mounted is elastic, if not as flexible as the conductive member 250 (260 and 271). Accordingly, the resonance frequency f3 of the first elastic member 280A and the resonance frequency f4 of the second elastic member 290A are higher than the resonance frequency f2 of the conductive member 250 (260 and 271), but can be lower than the resonance frequency f1 on each measurement axis of X axis, Y axis and Z axis of the sensor 100. From the above, according to the damping structure of the present embodiment, the expressions (1) and (2) described above are satisfied.

FIG. 9 shows the resonance frequency f1 of each measurement axis of X axis, Y axis, and Z axis of the sensor 100, equal to the resonance frequency of the circuit substrate 210A, is not adversely affected by the resonance frequency f2 of the conductive member 250 (260 and 271), the resonance frequency f3 of the first elastic member 280A, and the resonance frequency f4 of the second elastic member 290A. Accordingly, the sensor 100 in contact with the conductive member 250 (260 and 271), the first elastic member 280A and the second elastic member 290A can measure the physical quantity steadily without being adversely affected by the vibration from the outside. In addition, the sensor 100 supported by the first elastic member 280A and the second elastic member 290A can secure an impact resistance characteristic to withstand an impact such as falling.

FIG. 9 shows a response characteristic of the sensor module of a comparison example in which the first elastic member 280A and the second elastic member 290A of the present embodiment are not used. In the comparison example, vibration from the outside is superimposed on the resonance frequency of the sensor measurement axis in a band that includes the resonance frequency of the sensor in the vicinity of 900 Hz and an excessive output value as the sensor output is shown. According to the present embodiment, a proper value, which is a normal level L2 to which the abnormal level L1 of FIG. 9 is revised, can be obtained by the removal of the output value caused by the outside vibration from the output value of the comparison.

Here, the first elastic member 280A and the second elastic member 290A may be pressurized by the fastening of the lid 240A to the accommodator 230A by screwing, for example, or may not be pressurized. FIG. 9 shows a characteristic when the first elastic member 280A and the second elastic member 290B are compressed by 250 respectively. In this case, the resonance frequency f3 is the resonance frequency of the pressurized first elastic member 280A, and the resonance frequency f4 is the resonance frequency of the pressurized second elastic member 290A. Since the resonance frequency of the first elastic member 280A and the resonance frequency of the second elastic member 290B vary in accordance with the fastening force of the lid 240A and the accommodator 230A, the resonance frequency f3 and the resonance frequency f4 can also be adjusted by the adjustment of the fastening force.

It is possible that $5<A\leq30$, where A denotes the shore A hardness of the first elastic member 280A and the shore A hardness of the second elastic member 290A. The range of the shore A hardness is preferable for adjusting the resonance frequency. If the shore A hardness exceeds 30, the adjustment itself becomes difficult because it is too hard. If the shore A hardness is five or less, the span of adjustable range becomes narrow because it is too soft.

Here, whether or not the sensor module satisfies the inequalities (1) and (2) is determined as follows. First, the resonance frequency f1 is determined by the specification of the sensor 100. Next, frequency sweep is performed on the resonance frequency f2 of the conductive member 250 (260 and 271), the resonance frequency f3 of the first elastic member 280A, and the resonance frequency f4 of the second elastic member 290A in the single item state as shown in FIG. 9 for the determination. Next, after the sensor module 200A shown in FIG. 3 is assembled, the frequency sweep is performed as in FIG. 9 to obtain the output increase/decrease-frequency characteristic. Whether the inequalities (1) and (2) are satisfied can be determined if, among the obtained characteristics, the resonance frequencies in the vicinity of the resonance frequency f2 of the conductive member 250 (260 and 271), the resonance frequency f3 of the first elastic member 280A and the resonance frequency f4 of the second elastic member 290A, measured in a single item state, in addition to the resonance frequency f1 of the sensor 100, are obtained. Also, the resonance frequency f3 of the first elastic member 280A and the resonance frequency f4 of the second elastic member 290A in a single item state are compared with the resonance frequency f3 of the first elastic member 280A and the resonance frequency f4 of the second elastic member 290A in an assembled state to also find out how much tightening is needed for the displacement from the single item state value to the assembled state value.

3. Modification Examples of First Elastic Member and Second Elastic Member

Figure 10:
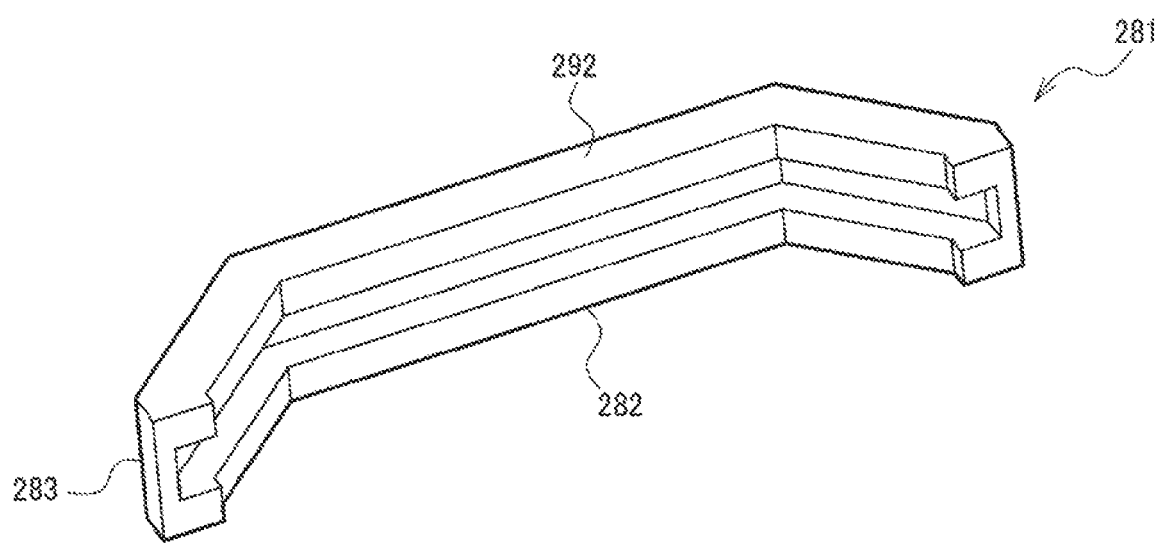
FIG. 10 is a perspective view showing a modification example of the elastic member.

Unlike the FIGS. 3 and 4, instead of being ring-shaped and formed along the peripheral edge of the circuit substrate 210A, the elastic member may be brought into contact with the first main surface 210B1 and the second main surface 210B2 along at least two sides, the two parallel sides 211 and 212, for example, out of the contour of the circuit substrate 210B shown in FIG. 4, for example. The elastic member 281 shown in FIG. 10 is integrally formed to include a first main surface contact portion 282 (a lower transverse lip), a second main surface contact portion 292 (an upper transverse lip), and a side surface contact portion 283 (a wall). The first main surface contact portion 282 is the first elastic member that contacts the first main surface 210B1, the second main surface contact portion 292 is the second elastic member that contacts the second main surface 210B2, and the side surface contact portion 283 spaces the first main surface contact portion 282 and the second main surface contact portion 292 apart by the distance corresponding to the thickness of the circuit substrate 210B and couples the first main surface contact portion 282 and the second main surface contact portion 292. Two elastic members 281 are used in a set: one elastic member 281 is mounted on one side 211 of the circuit substrate 210B and the other elastic member 281 is mounted on the other side 212 of the circuit substrate 210B. Since the integrated elastic member 281 is elastically mounted on the circuit substrate 210B, assembling work is facilitated.

Figure 11:
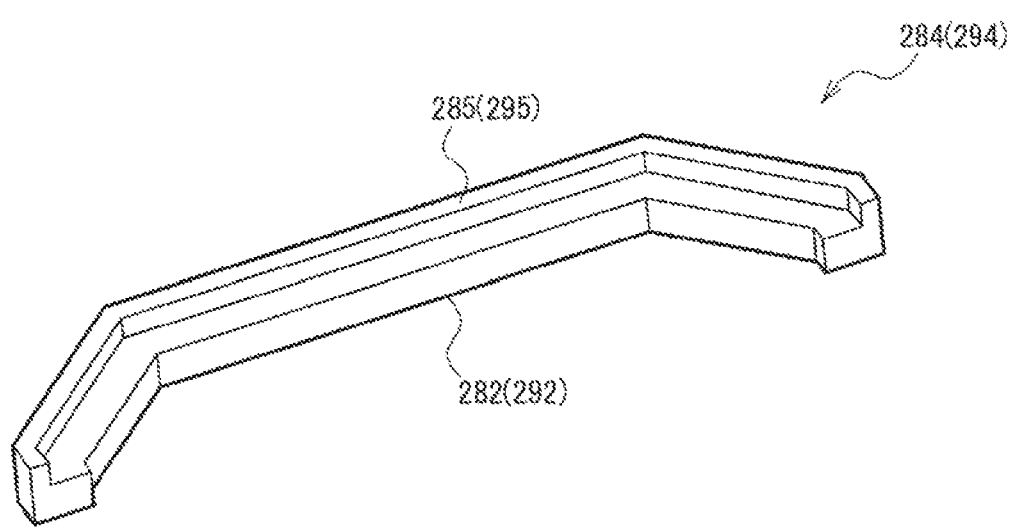
FIG. 11 is a perspective view showing another modification example of the elastic member.

FIG. 11 shows an elastic member 284 and an elastic member 294 into which the elastic member 281 shown in FIG. is halved along the height axis of the side surface contact portion 283. The elastic member 284 and the elastic member 294 can have the same shape. The elastic member 284 (294) has a main surface contact portion 282 (292) having the same shape as the first main surface contact portion 282 (the second contact portion 292) shown in FIG. 10 and a side surface contact portion 285 (295) having a height equal to or less than half the height of the side surface contact portion 283 shown in FIG. 10. Each of the two elastic members 284 (294) is used in a set: one elastic member 284 contacts the first main surface 210B1 of one side 211 of the circuit substrate 210B, and the other elastic member 294 contacts the second main surface 210B2 of the one side 211 of the circuit substrate 210B, while one elastic member 284 of the other set contacts the first main surface 210B1 of the other side 212 of the circuit substrate 210B and the other elastic member 294 of the other set contacts the second main surface 210B2 of the other side 212 of the circuit substrate 210B.

Figure 12:
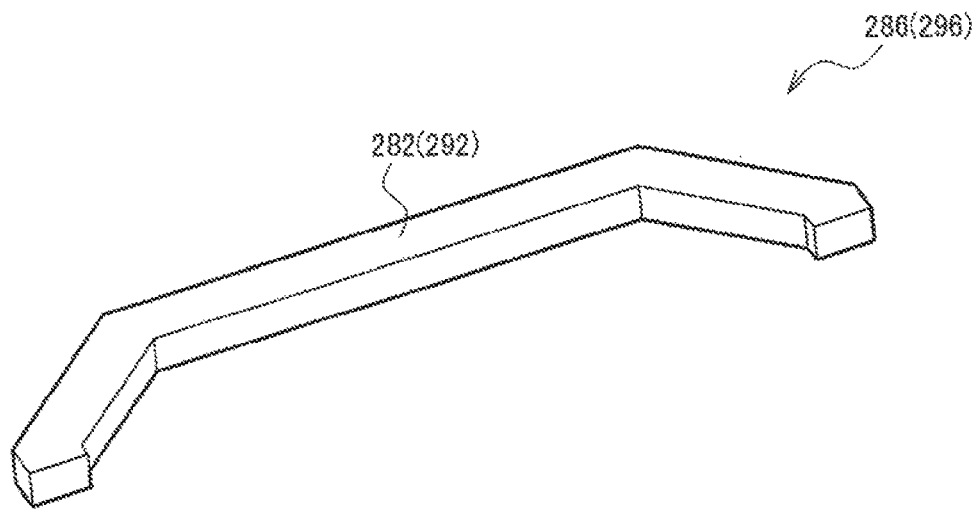
FIG. 12 is a perspective view showing still another modification example of the elastic member.

FIG. 12 shows an elastic member 286 (296) having only a main surface contact portion 282 (292) in the same shape as the first main surface contact portion 282 (the second main surface contact portion 292) of the elastic member 281 shown in FIG. 10. The elastic member 286 and the elastic member 296 can have the same shape. Each of the two elastic members 286 (296) shown in FIG. 12 is used in a set in the same way as the elastic member 284 (294) shown in FIG. 11.

4. Apparatuses Using Sensor Module

Hereinafter, apparatuses using the sensor module 200A (200B) having the configuration described above will be described with reference to FIGS. 13 to 21.

4.1 Inclinometer

Figure 13:
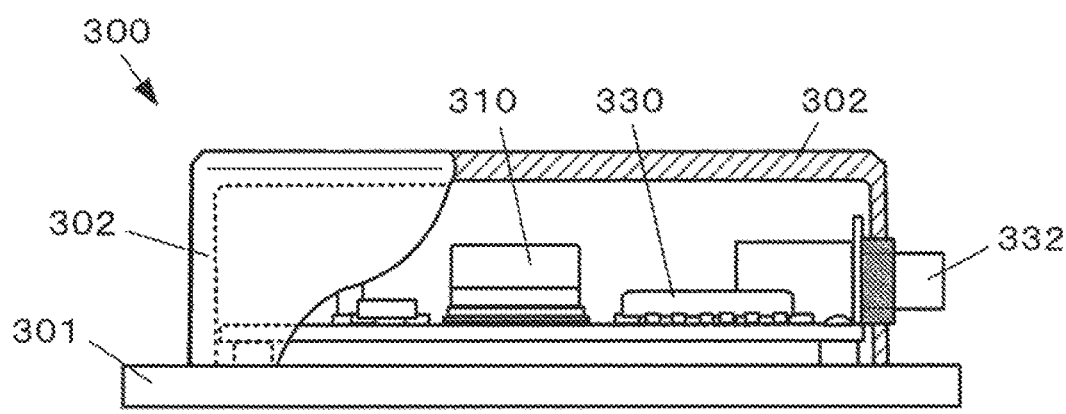
FIG. 13 is a side view showing an inclinometer having a sensor module.

FIG. 13 shows an example of a configuration of an inclinometer and is a side view showing a partial cross section thereof. The inclinometer 300 is a device that outputs a signal in accordance with the inclination angle of a position where the inclinometer 300 is installed. Specifically, in an inner space defined by an under case 301 and an upper case 302, the inclinometer 300 includes a sensor module 310 that has a structure of the sensor module 200A (200B) of the first embodiment, a calculator 330 that calculates the inclination angle based on the output signal of the sensor module 310, and an external output terminal 332 that outputs a signal in accordance with the inclination angle calculated by the calculator 330. The inclinometer 300 may include other elements as deemed appropriate. For example, a built-in battery, a power supply circuit, a radio device, and the like may be included.

The inclination calculator 330 is a circuit that calculates the inclination angle from the output signal of the sensor module 310 and outputs a signal in accordance with the inclination angle. For example, the calculator 330 can be realized by a general purpose integrated circuit (IC), a field programmable gate array (FPGA), or the like.

Acceleration in directions of X, Y, and Z axes which are orthogonal tri-axes is output from the sensor module 310. The inclinometer 300 measures the inclination angles of the X, Y, and Z axes (angles formed with respect to the horizontal planes of the X, Y, and Z axes) from the acceleration in the X, Y, and Z axis directions. For example, the inclinometer 300 may be mounted on a floor surface near the center of gravity of a vessel such that the X axis faces the bow direction of the vessel, the Y axis faces the portside of the vessel, and the Z axis runs in the floor surface vertical direction.

Figure 14:
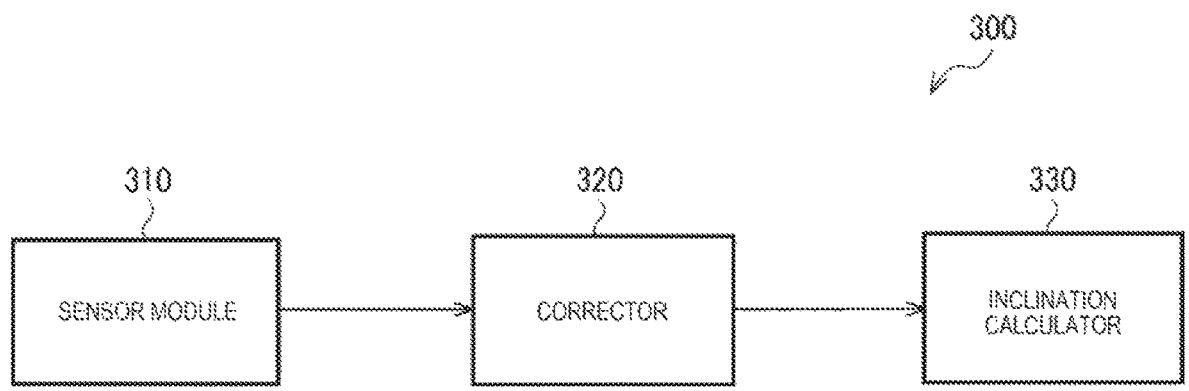
FIG. 14 is a block diagram of the inclinometer having a sensor module.

As shown in FIG. 14, a corrector 320 can be included between the sensor module 310 and the inclination calculator 330. The corrector 320 corrects the acceleration in the X, Y, and Z axis directions output from the sensor module 310. For example, the corrector 320 performs alignment correction of the acceleration in the X, Y, and Z axis directions output from the sensor module 310, offset correction, temperature drift correction or the like. The corrector 320 may be omitted when the alignment of the acceleration output from the sensor module 310, offset, temperature drift, or the like is small.

The inclination calculator 330 calculates the inclination with respect to the horizontal plane of each axis based on the acceleration in the X, Y, and Z axis directions corrected by the corrector 320.

Figure 15:
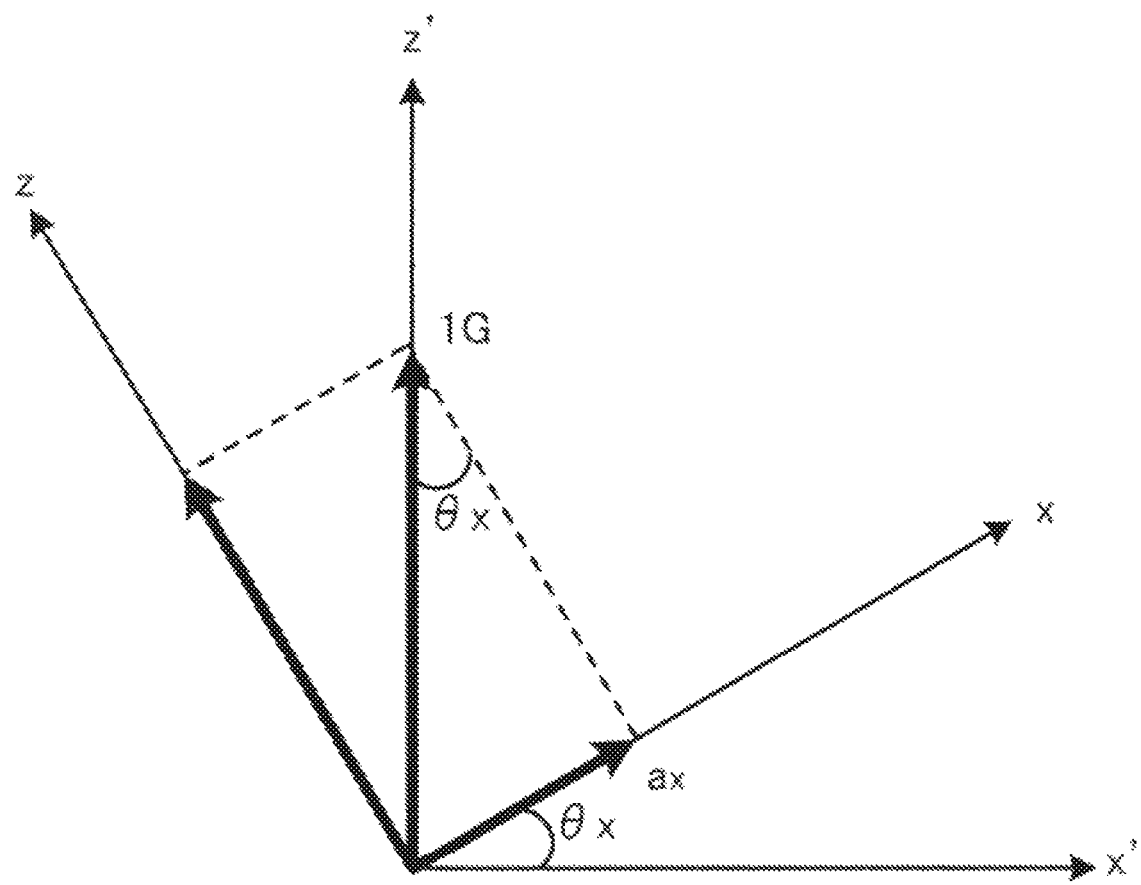
FIG. 15 is a coordinate view for describing a calculation example of an inclination angle.

FIG. 15 is a view describing an example of calculation of the inclination angle. "x'" shown in FIG. 15 indicates an axis parallel to the horizon direction and "z'" indicates an axis parallel to the gravity direction (vertical) respectively. "x" indicates the X axis of the sensor module 310. "z" indicates the Z axis of the sensor module 310. "y" axis of the sensor module 310 is assumed to face a rear side of the page. Also, the direction of the gravitation acceleration is upward in FIG. 15.

As shown in FIG. 15, the X axis of the sensor module 310 is tilted angle at an angle of $\theta_x$ about the Y axis as a rotation axis. At this time, the following expression (1) holds.

$$\sin\theta_x = \frac{a_x}{1G} \quad (1)$$

in which $a_x$ denotes the acceleration (gravity acceleration component) of the X axis direction output from the acceleration sensor 11.

"1 G" shown in the expression (1) is gravitational acceleration, and "1 G=9.80665 m/s$^2$".

By the expression (1), the inclination of "$\theta_x$" with respect to the horizontal direction of the X axis is represented by the following expression (2).

$$\theta_x = \sin^{-1}\frac{a_x}{1G} \quad (2)$$

Similarly, the inclinations "$\theta_y$" and "$\theta_z$" with respect to the horizontal directions of the y and z axes are represented by the following expressions (3) and (4).

$$\theta_y = \sin^{-1}\frac{a_y}{1G} \quad (3)$$

$$\theta_z = \sin^{-1}\frac{a_z}{1G} \quad (4)$$

"$a_y$" in expression (3) is the acceleration in the Y axis direction and "$a_z$" in expression (4) is the acceleration in the Z axis direction.

That is, the inclination calculator 330 calculates the inclination angle with respect to the horizontal directions of the X, Y, and z axes by performing calculations shown in the expressions (2) to (4) based on the accelerations "$a_x$", "$a_y$", and "$a_z$" in the X, Y, and Z axis directions output from the corrector 320 and the gravitational acceleration "1 G".

The inclination calculator 330 may calculate the inclination angle of each axis using the gravitational acceleration (1 G) set (stored) in the inclinometer 300 in advance. In this case, the latitude at which the inclinometer 300 is used may be taken into consideration in setting the value of the gravitational accelerator in the inclinometer 300.

Further, the inclination calculator 330 may calculate the gravitational acceleration from the acceleration output from the corrector 320. For example, the inclination calculator 330 can calculate the gravitational acceleration by "$(a_x^2+a_y^2+a_z^2)^{1/2}$".

4.2 Inertial Measure Unit

Figure 16:
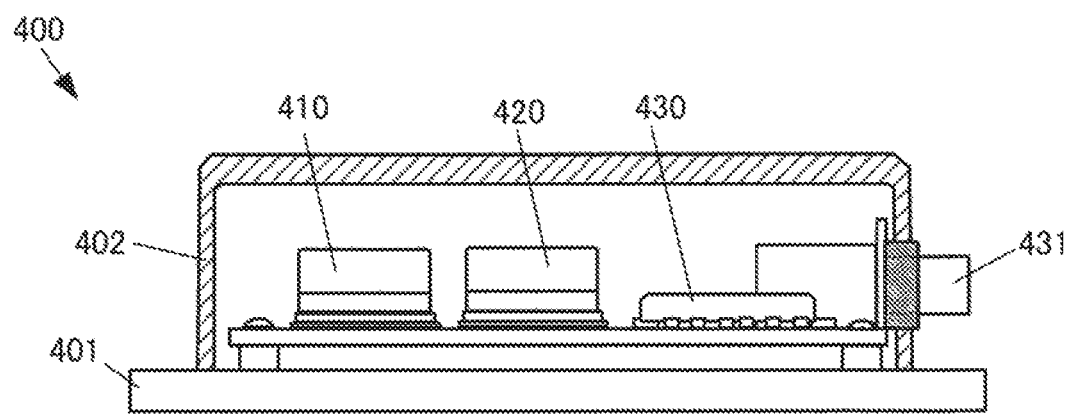
FIG. 16 is a side view showing an inertial measurement unit having a sensor module.
Figure 17:
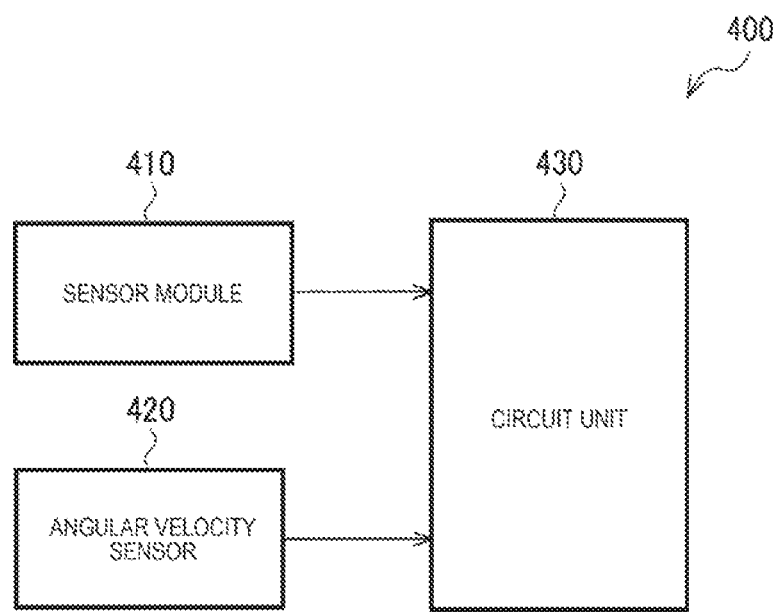
FIG. 17 is a block diagram of the inertial measurement unit.

FIG. 16 is a view showing a configuration example of an inertial measurement unit (IMG) and a side view showing a partial cross section thereof. FIG. 17 is a block diagram showing the inertial measurement unit. The inertial measurement unit 400 is an inertial measurement unit attached to the vehicle and includes, in an internal space defined by an under case 401 and an upper case 402, a sensor module 410 that has the same structure as the sensor module 200A (200B) of the embodiment, an angular velocity sensor 420, a circuit unit 430 that calculates a posture of the vehicle based on the acceleration signal of the sensor module 410 and the angular velocity signal of the angular velocity sensor 420, and an external output terminal 431 that outputs signal in accordance with the posture calculated by the circuit unit 430. Of course, elements other than these can be included as deemed appropriate. For example, a built-in battery, a power supply circuit, a radio device, and the like can be included.

The circuit unit 430 is realized by, for example, a general purpose integrated circuit (IC), a field programmable gate array (FPGA), calculates the posture of the vehicle to which the inertial measurement unit 400 is attached based on the acceleration signal of the sensor module 410 and the angular velocity signal of the angular velocity sensor 420, and outputs a signal in accordance with the posture.

According to the inertial measurement unit 400 of the present embodiment, since sensor module 410 uses the structure of the sensor module 200A (200B) of the present embodiment, accuracy of acceleration signal output from the sensor module 410 is high, so that measurement accuracy of the posture of the vehicle can be improved over the inertial measurement unit in the related art.

4.3 Structural Health Monitoring

Figure 18:
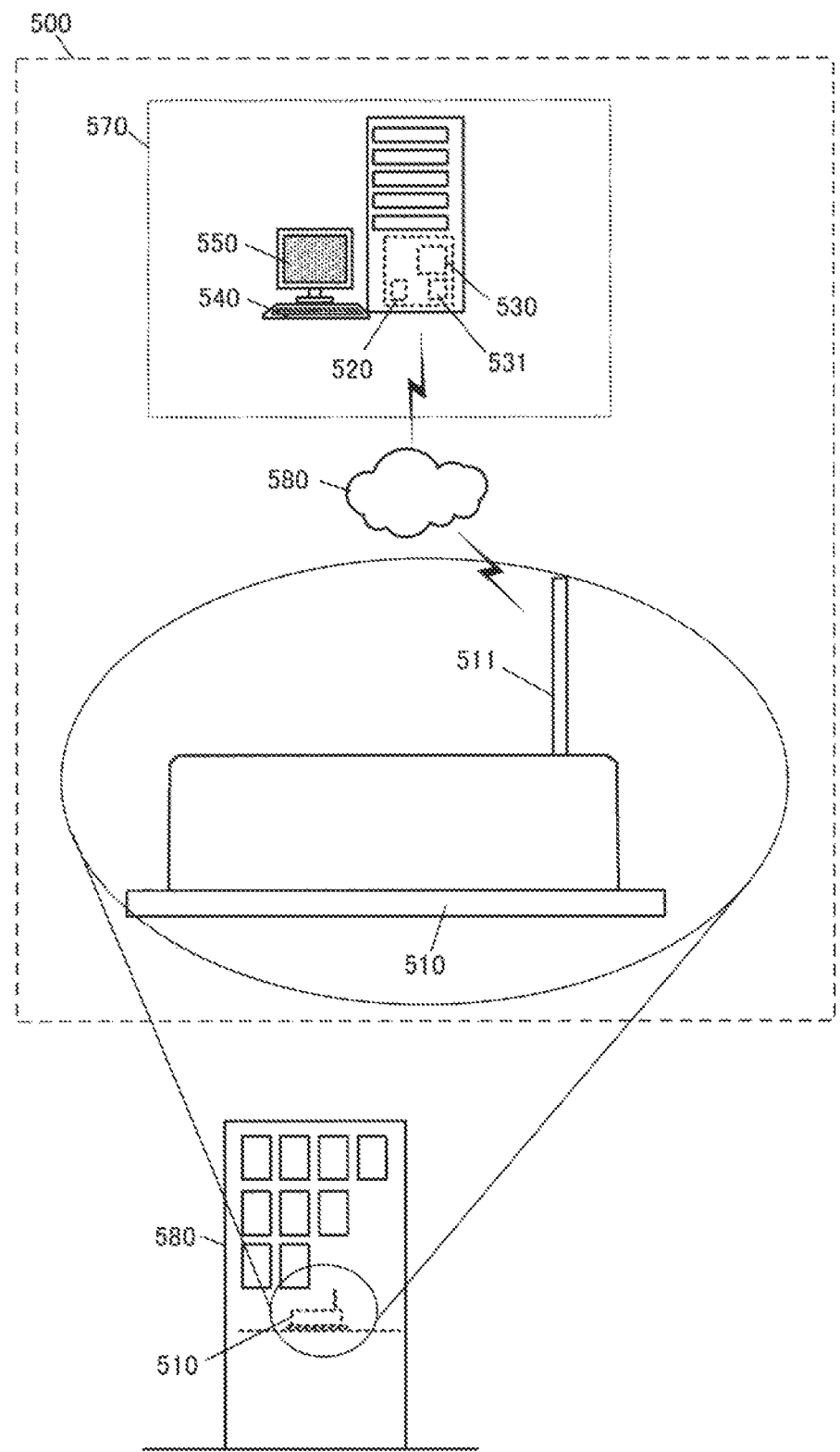
FIG. 18 is a schematic view showing a structural health monitoring having a sensor module.
Figure 19:
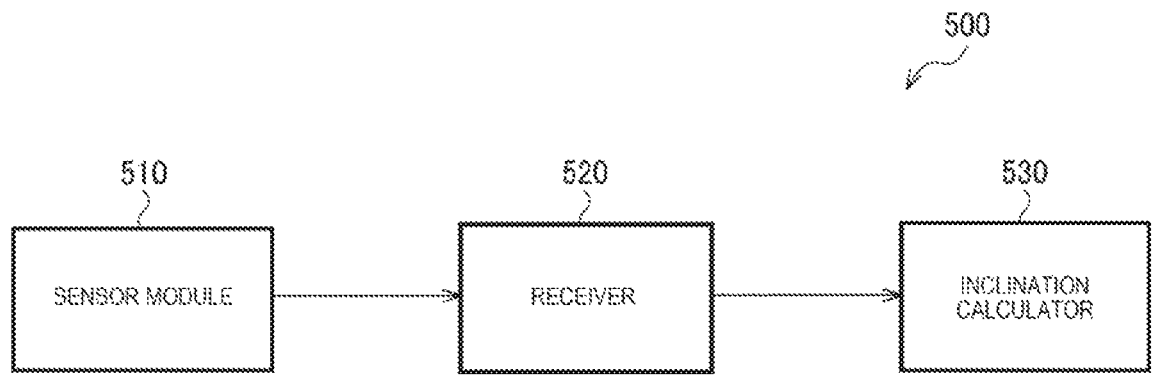
FIG. 19 is a block diagram of a structural health monitoring.

FIG. 18 shows a structural health monitoring (SHM) 500. The structural health monitoring 500 has the same structure as the sensor module 200 A (200 B) of the embodiment and has a sensor module 510 attached to a structural body 590 to be monitored. The sensor module 510 includes a transmitter 511 that transmits a measurement signal of the sensor 100. The transmitter 511 may be realized as a communication module and an antenna separate from the sensor module 510.

The sensor module 510 is coupled to, for example, the monitoring computer 570 through radio or priority communication network 580. The monitoring computer 570 includes a receiver 520 coupled to the sensor module 510 through the communication network 580 and an inclination calculator 530 that calculates the inclination angle of the structural body 590 based on the received signal of the receiver 520 (refer to FIG. 19).

In the present embodiment, the calculator 530 is realized by an application specific integrated circuit (ASIC), a field programmable gate array (FPGA) or the like mounted on the monitoring computer 460. However, the calculator 530 may be realized as a processor such as a central processing unit (CPU), the processor realizing the calculator in a form of software by arithmetically processing a program stored in the IC memory 531. The monitoring computer 570 receives various operations that the operator inputs through the keyboard 540 and displays the result of the calculation processing on a touch panel 550.

According to the structural health monitoring 500 of the present embodiment, the inclination of the structural body 590 is monitored with the sensor module 200A (200B) of the present embodiment. Therefore, it is possible to utilize the highly accurate measurement of the acceleration which is the operation effect of the sensor module 200A (200B), accurately measure the inclination of the structural body 590 to be monitored, and improve quality of monitoring the structural body 590.

4.4 Vehicle

Figure 20:
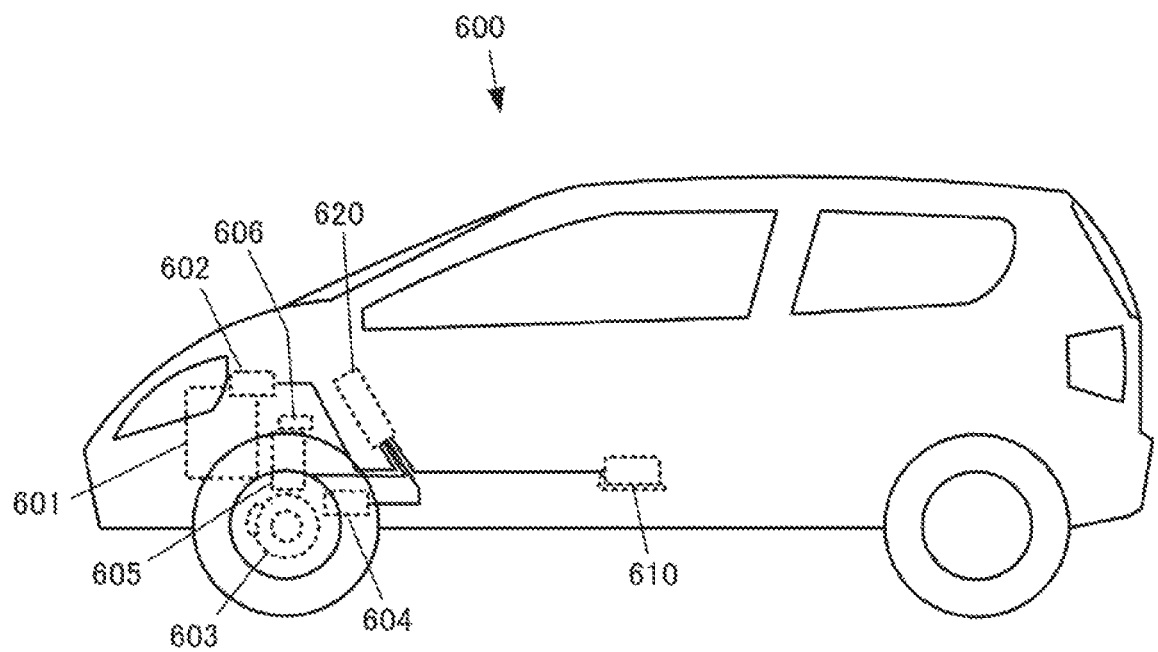
FIG. 20 is a schematic view showing a vehicle having a sensor module.

FIG. 20 is a diagram showing a configuration example of a vehicle. In this embodiment, a passenger vehicle is taken as an example of the vehicle 600 and a vehicle type can be changed as deemed appropriate. Also, the vehicle 600 may be a small vessel, an automated transport device, a transport vehicle within a premise, a forklift, or the like.

The vehicle 600 includes a sensor module 610 having the same structure as the sensor module 200A (200B) of the embodiment and an automatic operation (driving) controller (controller) 620 controlling at least one of the acceleration, braking, and steering based on the acceleration signal of the sensor module 610 and can switch on or off the automatic operation based on a measurement signal of the sensor module 610.

The controller 620 is realized by a computer mounted on a vehicle. The controller 620 is coupled to various sensors and controllers such as the sensor module 610, a throttle controller 602, a brake controller 604, a steering controller 606, and the like through a communication network such as an in-vehicle local area network (LAN) such that signals can be transmitted and received. Here, the throttle controller 602 controls the output of an engine 601. The brake controller 604 controls the operation of a brake 603. The steering controller 606 controls the operation of the power steering 605. It should be noted that the types of sensors and controllers coupled to the controller 620 are not limited thereto and can be set as deemed appropriate.

Then, the controller 620 performs a calculation processing based on, for example, an acceleration measurement signal of the sensor module 610 using an internally incorporated calculation unit, determines execution or non-execution of an automatic operation, and, when an automatic driving is preformed, transmits a control command signal to at least one of the throttle controller 602, the brake controller 604, and the steering controller 606, controlling at least one of acceleration, braking and steering.

Contents of the automatic control can be set as deemed appropriate. For example, when the acceleration measured by the sensor module 610 during cornering reaches a threshold value at which fear of a spin or corner-out is high, control may be performed to prevent the spin or corner-out. Also, when the acceleration measured by the sensor module 610 during a stop reaches a threshold value at which a possibility of sudden forward or backward acceleration by a mistaken operation is high, control may be performed to force a shut-off of a throttle and compel an activation of sudden braking.

An advanced driver assistance system (ADAS) locator used in the automatically operated vehicle 600 shown in FIG. 20 includes the Global Navigation Satellite System (GNSS) receiver and a map database storing map data in addition to an inertia sensor that includes the sensor module 610. The ADAS locator keeps track of a traveling position of the vehicle in real time by combing positioning signals received by the GNSS receiver and measurement result of the inertia sensor. The ADAS locator reads the map data from the map database. The output from the ADAS locator including the sensor module 610 is input to the automatic operation controller 620. The automatic operation controller 620 controls at least one of the acceleration, braking, and steering of the vehicle 600 based on an output from the ADAS locator (a measurement signal from the sensor module 610 is included).

Figure 21:
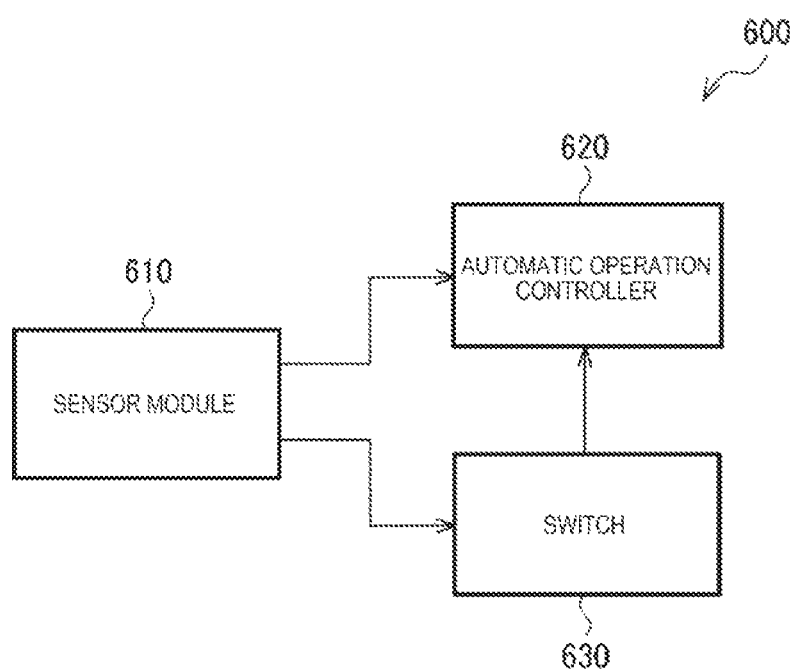
FIG. 21 is a block diagram of the vehicle.

FIG. 21 is a block diagram showing a system relating to the vehicle 600. A switch 630 switches on or off the automatic operation in the automatic operation controller 620 based on a change of the output from the ADAS locator (a change in the measurement signal from the sensor module 610 is included). For example, the switch 630 outputs a switch signal to stop the automatic operation to the controller 620 when measurement capability of the sensor (the sensor module 610 is included) in the ADAS locator deteriorates.

Further, the Global Navigation Satellite System (GNSS) described above may use the Global Positioning System (GPS) as a satellite positioning system. Alternatively, at least one or more of the satellite positioning system such as the European Geostationary-Satellite Navigation Overlay Service (EGNOS), the Quasi Zenith Satellite System (QZSS), the Global Navigation Satellite System (GLONASS), the GALILEO, the BeiDou navigation satellite system (BeiDou) and the like may be used. Also, the stationary satellite type Satellite-based Augmentation System (SBAS) such as the Wide Area Augmentation System (WAAS), the European Geostationary-Satellite Navigation Overlay Service (EGNOS) and the like may be used in at least one of the satellite position systems.

Although the present embodiment has been described in detail as above, it will be easily understood by those skilled in the art that many modifications are possible that do not deviate from the novel matters and effects of the present disclosure. Therefore, all such modifications are included in the scope of the present disclosure. For example, in the specification or the drawings, at least once, a term described together with a different, but broader or equivalent term can be replaced with the different term at any point in the specification or the drawings. Also, entire combinations of the present embodiment and modification examples are included in the scope of the present disclosure.

What is claimed is:

1. A sensor module comprising:
   a circuit substrate;
   a sensor mounted on the circuit substrate;
   a conductive member having a first end electrically coupled to the circuit substrate;
   a connector substrate electrically coupled to a second end of the conductive member;
   an accommodator having a recessed opening within which the circuit substrate, the connector substrate, and the conductive member are accommodated;
   a lid secured to the accommodator and entirely enclosing the opening;
   a first elastic member in contact with a first main surface of the circuit substrate and the accommodator; and
   a second elastic member in contact with a second main surface of the circuit substrate and the lid, the second main surface being on an opposite side as the first main surface, wherein
   a resonance frequency range of the sensor is f1,
   a resonance frequency range of the conductive member is f2,
   a resonance frequency range of the first elastic member is f3,
   a resonance frequency range of the second elastic member is f4, $f2 < f3 < f1$, $f2 < f4 < f1$, and $900 \leq f1 \leq 1000$ Hz.

2. The sensor module according to claim 1, further comprising:
   a connector that interconnects the first elastic member and the second elastic member.

3. The sensor module according to claim 1, wherein the first elastic member and the second elastic member are pressurized, the resonance frequency range of the pressurized first elastic member is f3, and the resonance frequency range of the pressurized second elastic member is f4.

4. The sensor module according to claim 1, wherein a shore hardness of the first and second elastic members is A, and $5 < A \leq 30$.

5. The sensor module according to claim 1, wherein the first elastic member and the second elastic member are made of rubber.

6. The sensor module according to claim 1, wherein the sensor measures acceleration.

7. An inclinometer comprising:
   the sensor module according to claim 6; and
   a calculator that, based on an output signal from the sensor module attached to a structural body, calculates an inclination angle of the structural body.

8. A structural health monitoring comprising:
   the sensor module according to claim 6;
   a receiver that receives a measurement signal from the sensor module attached to a structural body; and
   a calculator that calculates an inclination angle of the structural body based on a signal output from the receiver.

9. A sensor module comprising:
   a circuit substrate;
   a sensor mounted on the circuit substrate;
   an elongated conductive member having a first end electrically coupled to the circuit substrate;
   a connector substrate electrically coupled to a second end of the elongated conductive member;
   a package accommodating the circuit substrate, the connector substrate, and the elongated conductive member therein, the package including:
   a base having a recessed opening defined by a bottom and a perimeter wall upstanding from the bottom;
   a step located at an interface of the bottom and the wall; and
   a lid secured to the base and entirely enclosing the opening;
   a first elastic insert sandwiched directly between a first main surface of the circuit substrate and the step, the first main surface facing toward the bottom of the package; and a second elastic insert sandwiched directly between a second main surface of the circuit substrate and the lid, the second main surface facing toward the lid of the package, wherein
a resonance frequency, range of the sensor is f1,
a resonance frequency range of the conductive member is f2,
a resonance frequency range of the first elastic member is f3,
a resonance frequency range of the second elastic member is f4, $f2<f3<f1$, $f2<f4<f1$, and $900 \leq f1 \leq 1000$ Hz.

10. The sensor module according to claim 9, further comprising:
an external wall spanning from the first elastic insert to the second elastic insert and abutting against the wall of the package,
wherein the first elastic insert, the second elastic insert and the wall are a monolithic body.

11. The sensor module according to claim 9, wherein the first elastic insert and the second elastic insert are pressurized, the resonance frequency range of the pressurized first elastic insert is f3, and the resonance frequency range of the pressurized second elastic insert is f4.

12. The sensor module according to claim 9, wherein a shore hardness of the first and second elastic inserts is A, and $5<A\leq30$.

13. The sensor module according to claim 9, wherein the first elastic insert and the second elastic insert are made of rubber.

14. The sensor module according to claim 9, wherein the first and second elastic inserts are endless loops.

15. The sensor module according to claim 14, wherein the base of the package four sides, and
the first and second elastic inserts extend along three of the four sides of the base.

16. The sensor module according to claim 9, wherein the base of the package has four sides, and
the first and second elastic inserts extend along the four sides of the base.

17. The sensor module according to claim 9, wherein the first elastic insert includes:
a lip; and
an external wall upstanding from the lip, and
the external wall is abutting against the wall of the package.

18. The sensor module according to claim 9, further comprising:
wherein the second elastic insert includes:
a lip; and
an external wall upstanding from the lip, and
the external wall is abutting against the wall of the package.

19. The sensor module according to claim 9, further comprising:
wherein the first elastic insert includes:
a first lip; and
a first external wall upstanding from the first lip, and
the first external wall is abutting against the wall of the package,
wherein the second elastic insert includes:
a second lip; and
a second external wall upstanding from the second lip, and
the second external wall is abutting against the wall of the package.

20. The sensor module according to claim 9, wherein the first and second elastic inserts are elastic rectangular bars.

* * * * *